United States Patent [19]
Kessler, Jr.

[11] Patent Number: 5,830,060
[45] Date of Patent: Nov. 3, 1998

[54] MACHINE FOR CUTTING KERNELS FROM EARS OF CORN

[75] Inventor: Harry T. Kessler, Jr., Eugene, Oreg.

[73] Assignee: A & K Development Co., Eugene, Oreg.

[21] Appl. No.: 760,476

[22] Filed: Dec. 5, 1996

[51] Int. Cl.$^6$ ..................................................... A01F 11/06
[52] U.S. Cl. ............................. 460/54; 460/57; 460/136
[58] Field of Search ................................ 460/54, 53, 55, 460/56, 57, 58, 48, 135, 136; 56/115, 117, 330, 340.1

[56] References Cited

U.S. PATENT DOCUMENTS

| | | |
|---|---|---|
| 1,165,288 | 12/1915 | Rimmer . |
| 1,725,391 | 8/1929 | Brown . |
| 1,798,846 | 3/1931 | Kennedy . |
| 2,180,859 | 11/1939 | Borchers .................................. 248/18 |
| 2,386,955 | 10/1945 | Kerr . |
| 2,577,530 | 12/1951 | Kerr . |
| 3,131,699 | 5/1964 | Cover et al. ............................... 460/54 |
| 3,203,427 | 8/1965 | Urschel ................................. 460/56 X |
| 3,527,549 | 9/1970 | Seward et al. ........................... 417/363 |

*Primary Examiner*—Terry Lee Melius
*Attorney, Agent, or Firm*—James D. Givnan, Jr.

[57] ABSTRACT

A machine having pairs of powered rollers for propelling ears of corn along a course through a cutter head assembly for kernel separation. A hydraulic motor drives each roller by means of a powered shaft which, along with the motor, may be displaced during roller contact with a passing ear of corn by reason of flexible motor mounts each inducing a yieldable distal portion for motor attachment. The motors are shown in fluid communication with a single source of pressurized fluid. Equalizer arms each associated with a powered shaft ensures uniform, opposite displacement of each pair of rollers during contact with an ear of corn. A link coupling each pair of equalizer arms, and indirectly the shafts associated therewith, effects uniform roller displacement to permit ear travel along an axial course through the machine.

15 Claims, 5 Drawing Sheets

MACHINE FOR CUTTING KERNELS FROM EARS OF CORN

BACKGROUND OF THE INVENTION

The present invention pertains generally to machines for severing kernels of corn from an ear of corn.

Currently in use in the food processing industry are machines utilizing rotary cutter heads for severing corn kernels. Such machines include powered rollers to both propel ears of corn in succession along a common path with some of the powered rollers serving as gauging rollers, displaceable by a passing ear of corn. Such gauging rollers also propel the ear of corn into an adjacent rotary cutter head whereafter still another pair of powered rollers continues passage of the ear of corn.

U.S. Pat. Nos. 2,386,955 and 2,577,530 disclose machines generally embodying the foregoing description. The machines disclosed in these patents utilize sets of powered rollers arranged in pairs with one roller of each pair vertically offset from the course of an ear of corn through the machine with a cutter head of the machine utilizing knives positionable during travel about the passing ears. Such cutter heads are well known in the food processing industry.

The paired shafts of the prior art machine in U.S. Pat. No. 2,577,530 each carry a powered roller with shaft and roller being displaced during ear passage between each cooperating pair of rollers. As such up and down displacement should be equal but in opposite directions during passage of an ear between upper and lower gauging rollers, a pair of upper and lower equalizer arms are utilized with the arms rocked about separate axes. For equal arm travel or displacement, the arms are interconnected by a tooth and clevis arrangement which is subject to rapid wear ultimately contributing to imprecise cutting of kernels by the cutter head and product waste.

Another drawback to known corn cutter machines is that the roller equipped shafts each include a universal joint to permit up and down displacement of a shaft segment during passage of an ear between cooperating shaft mounted rollers. Universal joints are costly components and require regular servicing. Replacement of same incurs considerable down time which is costly as such machines not uncommonly run 24 hours a day seven days a week during processing season.

Shaft displacement during passage of an ear of corn between a pair of gauging rollers imparts lateral displacement to the roller equipped shafts which is translated by equalizer arms and mechanical linkage to a shaft on which a first gear of a cutter head is carried and which gear drives a series of cutting knives. A second gear on said shaft is rotationally positionable relative the first gear by the aforementioned mechanical linkage and serves to close or reduce the orbital path of the knives. Conversely the path of the knives is increased as a result of centrifugal force acting on same when knife restraints are retracted by rotational displacement of said second gear. Such an arrangement is disclosed in U.S. Pat. No. 2,577,530.

SUMMARY OF THE PRESENT INVENTION

The present invention is embodied within an improved machine for removing kernels from ears of corn wherein cooperating pairs of powered rollers are utilized to propel ears of corn through a cutter head of the machine with certain of said rollers additionally serving to gauge ear size for subsequent positioning of cutter head blades. Roller equipped shafts of the present machine are individually powered by hydraulic motors with mounting means for each motor permitting roller and shaft displacement as the roller passes along the contour of an ear of corn. Utilization of a flexible panel as a motor mount permits dispensing with universal joints in the roller equipped shafts to effect a reduction in machine maintenance as well as the machine cost of manufacture. Equalizer arms, responsive to displacement of the roller equipped shafts, are linked in pairs to one another by a link to ensure uniform displacement of the upper and lower shafts during roller contact with an ear of corn. The equalizer arms may be in the general shape of bell-cranks with a minor arm of each equalizer arm pivotally coupled to the link between the arms and which compel equal arm movement about separate pivot points. The link and pivot pins provide wear resistant surfaces to avoid erratic control of cutter head knives and product waste therefrom.

The hydraulic motors are in series communication with one another and with a pressure source resulting in uniform motor speed.

Important objectives of the present invention include the provision of a motor, flexible motor mount and driven shaft combination which permits shaft displacement without use of a universal type joint in the combination; the provision of several powered rollers each powered by their respective hydraulic motors with the motors in fluid series with one another; the provision of a flexible motor mount which permits displacement of a hydraulic motor thereon and the motor output shaft; the provision of a link coupling equalizer arms associated with a pair of powered shafts to control, in a precise manner, synchronized displacement of the shafts relative their static positions.

DETAILED DESCRIPTION OF THE PREFERRED EMBODIMENTS

Figure 1:
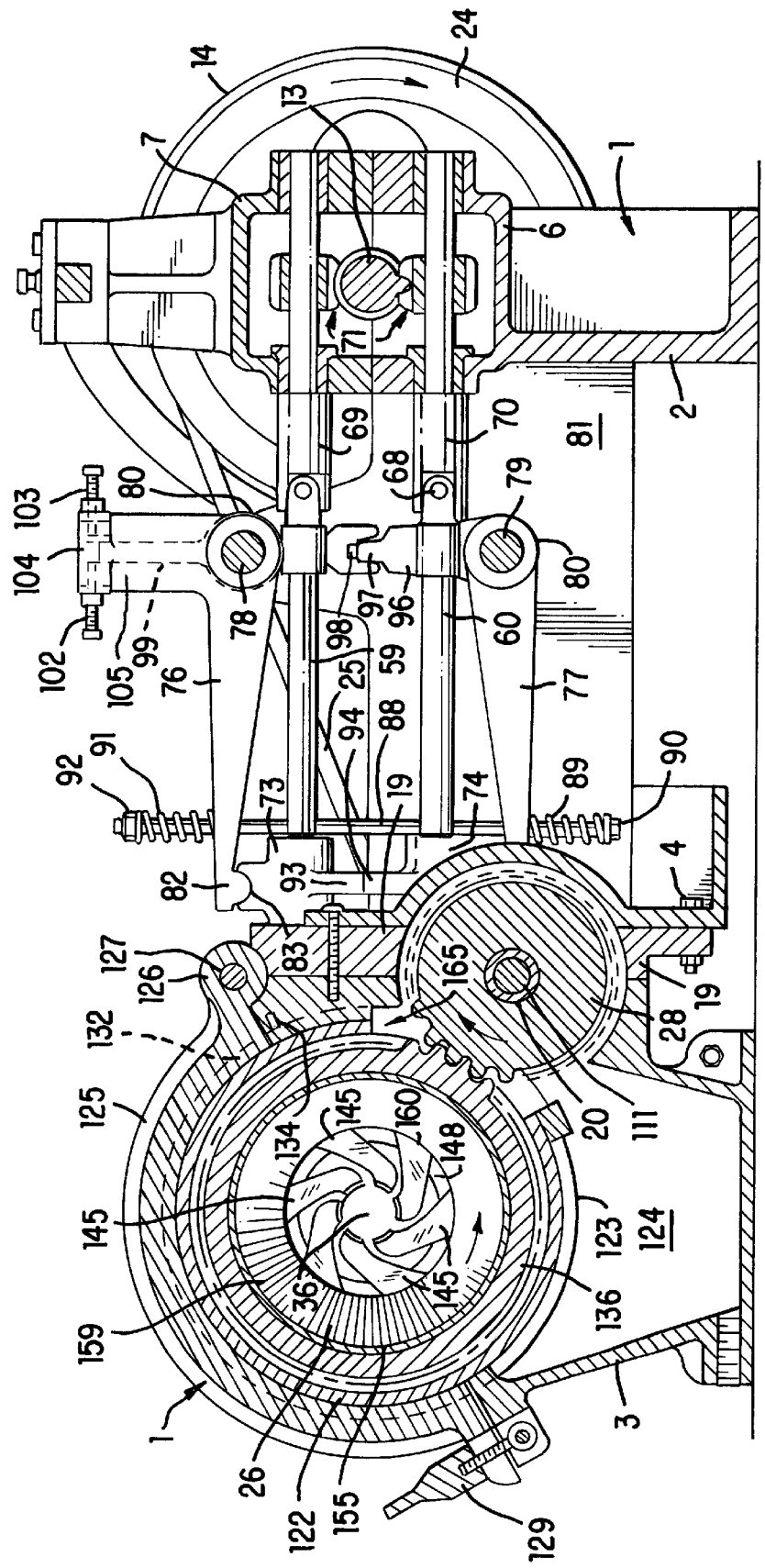
FIG. 1 is a transverse sectional view through a prior art machine for cutting kernels from ears of corn.
Figure 2:
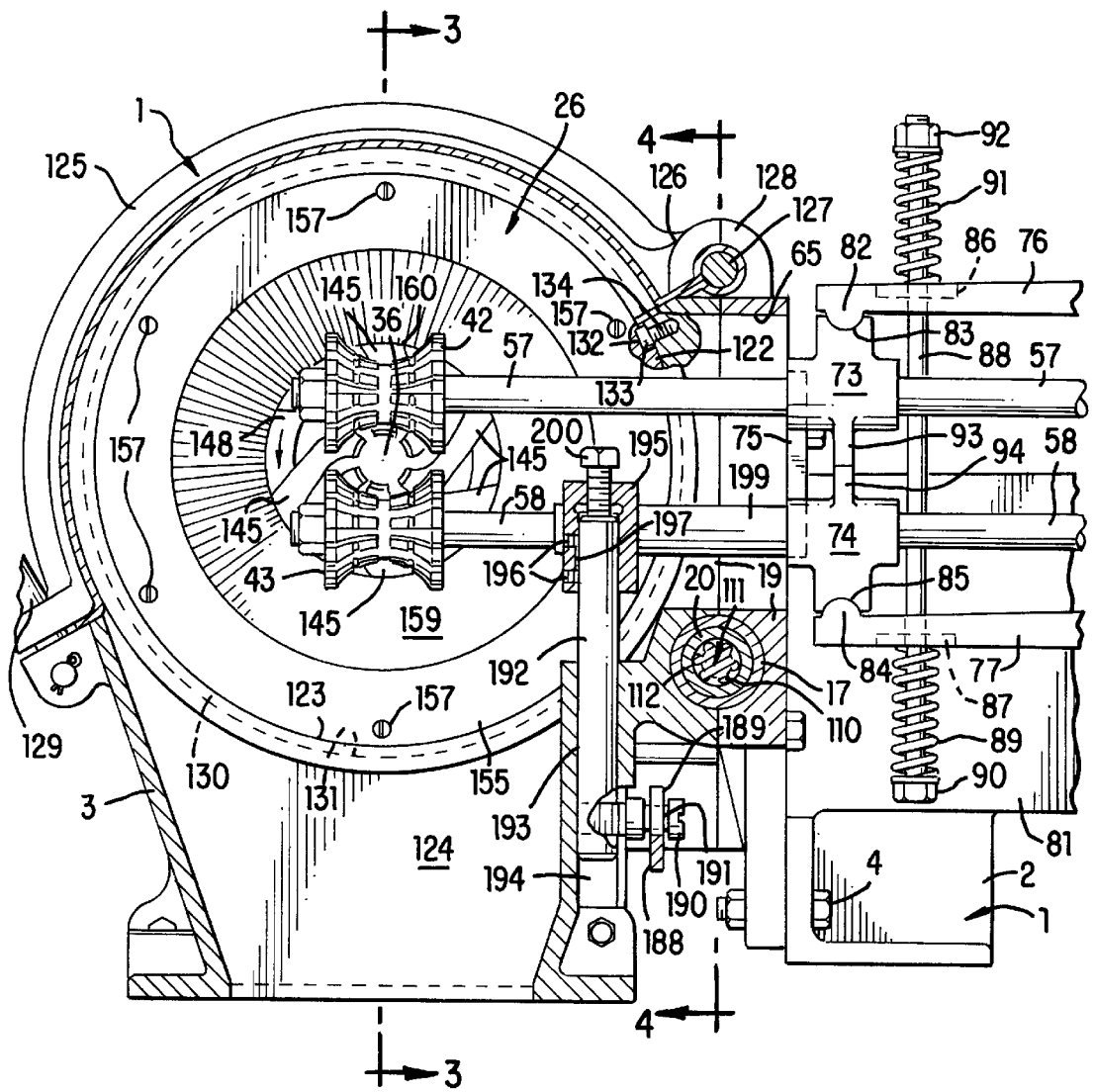
FIG. 2 is an enlarged fragmentary transverse sectional view of the prior art machine shown in FIG. 1.

A prior art machine for processing ears of corn is disclosed in U.S. Pat. No. 2,577,530, FIGS. 1 and 2 of which are shown in the drawings of this application and which patent is incorporated herein by reference as is U.S. Pat. No. 2,386,955 issued to the same patentee.

With attention to the drawings of the present machine, wherein applied reference numerals indicate parts similarly hereinafter identified, the reference numeral 1 indicates generally a machine for severing kernels from ears processed by the machine. The machine includes a cutter head assembly generally at 2 enclosed in a housing 3 while an electric motor at 4 serves to drive gear equipped concentric shafts driving orbital knives in cutter head 2. A machine base includes side plates 6 and 7 with the plates supported by base rails as at 8 adapted for suitable mounting on a support surface 9. A conveyor (not shown) delivers the ears of corn in successive fashion for passage along a course at A.

Figure 3:
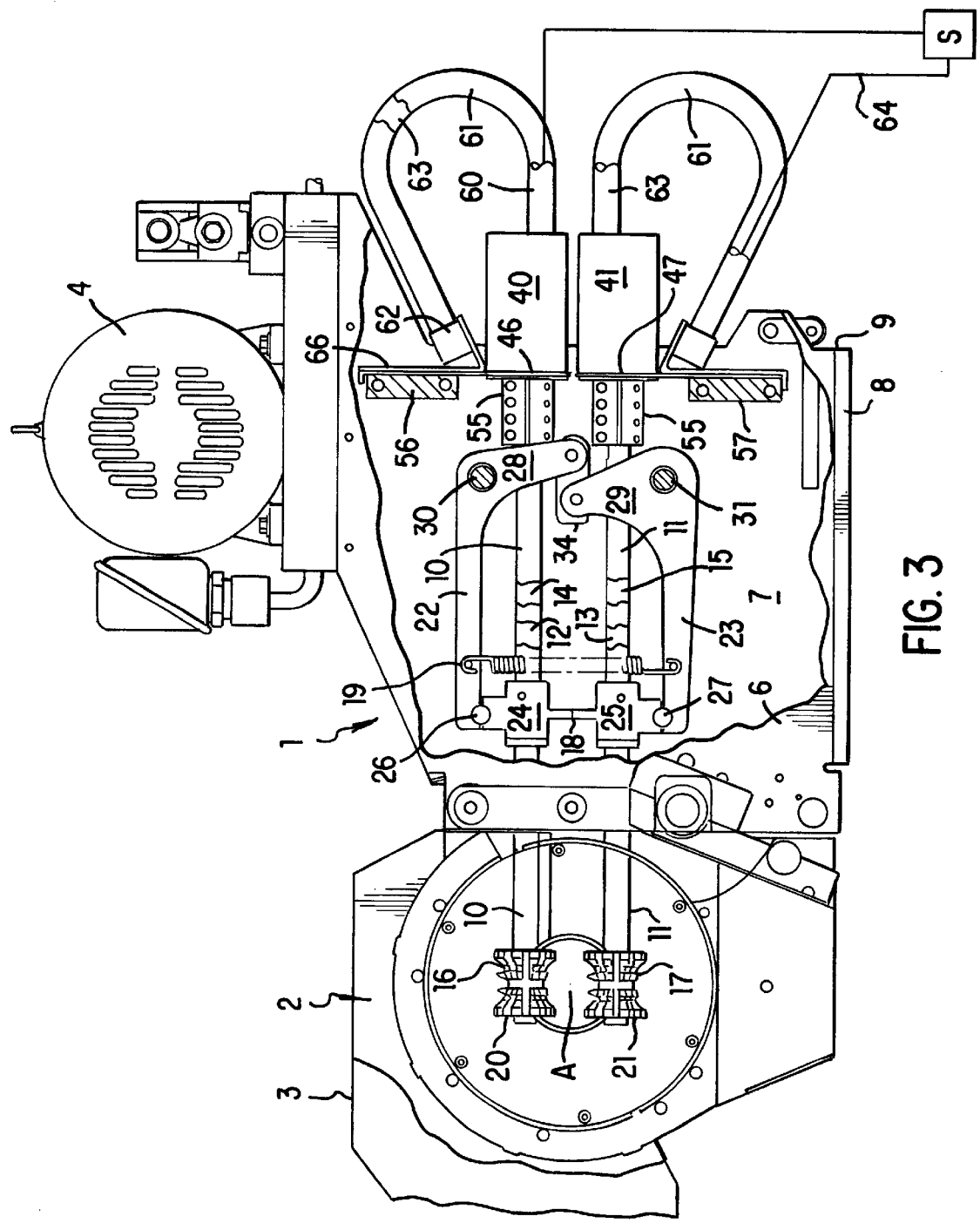
FIG. 3 is a front elevational view of a machine similar to the prior art machine shown in FIGS. 1 and 2 but embodying the present invention.

The machine is equipped with pairs of powered shafts with a first pair indicated at 10 and 11, a second pair at 12 and 13, and a third pair at 14 and 15, with the shafts provided with upper and lower paired rollers as at 16 and 17, the rollers of each pair being uniformly spaced above and below course A denoting the course or path of ears of corn through cutter head assembly 2. A second pair of shaft carried powered rollers at 20 and 21 is located immediately in advance of cutter head assembly 2 and may be termed gauging rollers as the upward and downward displacement of same during passage of an ear of corn therepast ultimately controls the positioning of orbital cutter head knives shown in prior art FIG. 1. Means are shown in U.S. Pat. No. 2,577,539 for translating shaft displacement to positioning of the orbital knives. A still additional pair of rollers (not shown) on shafts 14, 15 are immediately downstream from cutter head assembly 2 and serve to draw the processed ear of corn out of the cutter head assembly and discharge same. The pairs of powered shafts 10–11, 12–13 and 14–15 are displaceable upwardly and downwardly during contact of their respective rollers with a passing ear of corn moving along course A. To ensure axial passage of the ears being processed along course A, each pair of shaft mounted rollers yields simultaneously in opposite directions while remaining in driving contact with the ear as extension springs as at 19 bias the shafts into ear engagement and the static full line, horizontal position shown in FIG. 3.

The following description of equalizer arms as at 22 and 23 acting on shafts 10 and 11 is applicable to like pairs of arms acting on shafts 12–13 and 14–15. A stop 18 limits closing movement of the powered shafts. Each of the powered shafts 12 through 15 extends through like bearing blocks as at 24 and 25 with each bearing block also associated with a pair of equalizer arms. Each set of equalizer arms at all times bears inwardly upon the bearing blocks 24–25 by the action of extension spring 19. The equalizer arms may be shaped as bell-cranks with minor arms at 28 and 29. Each pair of equalizer arms is carried by and pivots about shafts 30 and 31 carried by side plates 6 and 7 of the machine and about which shafts the equalizer arms rock in response to roller contact with an ear of corn and, oppositely, extension spring 19.

Figure 4:
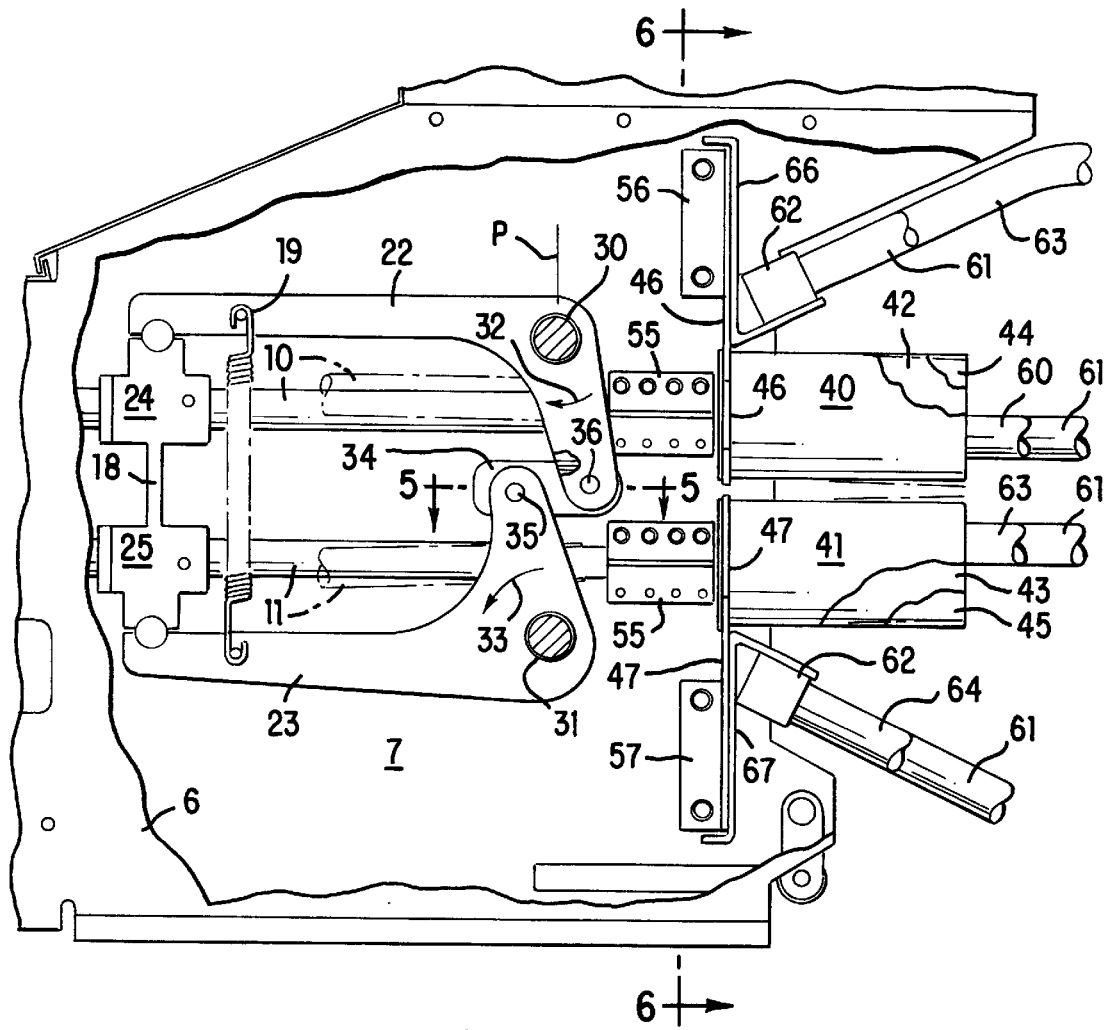
FIG. 4 is an enlarged fragmentary view of the machine shown in FIG. 3.
Figure 5:
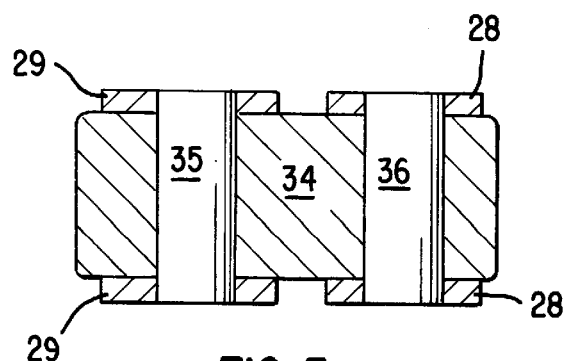
FIG. 5 is a horizontal sectional view taken downwardly along line 5—5 of FIG. 4.

Each cooperating pair of equalizer arms as at 22–23 and the minor arms thereof 28–29 carry a link 34 and pivot pins 35–36 pivotally coupling the adjacent ends of minor arms 28 and 29 to constrain equalizer arms 22–23 for uniform arcuate movement per arrows 32–33 in FIG. 4. Link pivot pins 35–36 are oppositely offset from a vertical plane P containing arm supporting shafts 30 and 31.

With attention again to the pair of powered shafts 12 and 13 immediately forward of cutter head assembly 2 and which carry rollers 20 and 21, shaft 13 may actuate a push rod of the type shown in prior art U.S. Pat. No. 2,577,530 FIG. 2 at 192 to rock a lever arm 188 and associated levers to rotationally position concentric shafts and gears thereon which, in turn, position cutter head assembly knives at 145.

Figure 6:
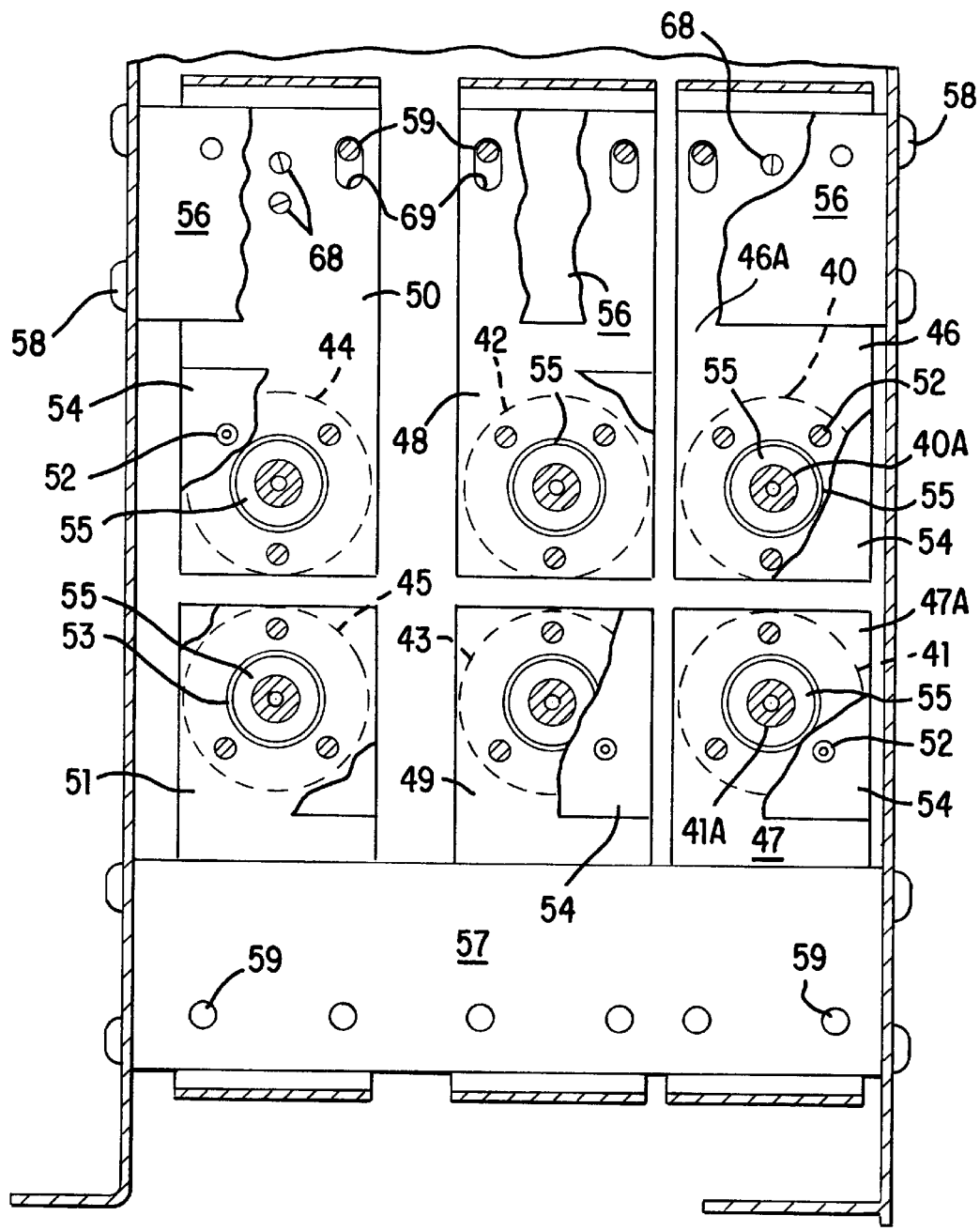
FIG. 6 is a vertical sectional view taken along line 6—6 of FIG. 4.

The pairs of powered shafts 10–11; 12–13 and 14–15 are driven by hydraulic motors 40, 41, 42, 43, 44, 45 shown in FIG. 6 via motor output shafts as at 40A–41A. Each pair of powered shafts is displaced simultaneously in opposite directions during passage of an ear of corn between a pair of cooperating rollers thereon. Such shaft displacement is permitted by flexible motor mounts 46–47, 48–49 and 50–51 with each serving to individually support hydraulic motors 40 through 45. Fasteners as at 52 extend through apertures each in a distal planar position as at 46A–47A of each mount and into engagement with each motor housing. Apertures as at 53 receive a motor shaft. A clamp as at 54 is located on each plate opposite the motor thereon. Such yieldable mounting of hydraulic motors 40 through 45 permits virtually continuous upward and downward displacement of powered shafts 10–15 and the rollers thereon during machine operation. Shaft connectors as at 55 serve to couple motor output shafts as at 40A–41A with their respective powered shafts.

A suitable material for flexible motor mounts 46–51 is a synthetic plastic product sold under the registered trademark SCOTCH PLY by the 3-M Company with the material manufactured in sheets and having thickness of approximately 1/8th inch and being of three ply construction with a "memory" capability for return to a planar shape. Each motor mount 46–51 is suitably secured at a proximal position thereof to an upper or lower block 56 or 57 which extend crosswise of and are suitably secured by fasteners 58 to machine sidewalls 6 and 7. The blocks are drilled and tapped to receive fasteners 59 securing a proximal portion of each flexible motor mount in place.

Driving the yieldably mounted hydraulic motors 40–45 is a flow of pressurized hydraulic fluid from a positive displacement pump source S. A hydraulic conduit 60 directs pump output to a first motor, as for example motor 40, of the six motors 40–45 with a second conduit 61 directing fluid discharged from said first motor to a ported block as at 62 which directs the incoming flow into another conduit 63 serving, for example, adjacent hydraulic motor 42 and so on until all six hydraulic motors 40–45 are served. Motor speed is uniform by reason of being in fluid series. Transfer of hydraulic oil from a motor discharge line 61 to an inlet line 63 of an adjacent motor is through a ported block 62 each adapted to receive a pair of hose ends in communication with adjacent motors. A return line is at 64 and terminates at source S.

Provision is made for adjustment of motors 40–45 by reason of the motor mounts 46–51 being carried by upper and lower brackets as at 66–67 which also serve to receive earlier mentioned ported blocks 62. Each motor mount is attached to its respective bracket by fasteners as at 68 in FIG. 6. The bracket and attached motor mount may then be vertically adjusted along with the hydraulic motor in place thereon upon loosening a pair of bolts 59 which secure each bracket and motor mount to an upper or lower block 56 or 57. Such adjustable mounting of a motor permits the roller at the opposite end of the motor powered shaft to be located in a precise manner with respect to its companion roller. Elongate openings as at 69 in the bracket and motor mount permit such adjustment.

While a specific material has been noted other synthetic sheet stock material may be suitable for motor mount use permitting motor output shaft displacement.

While I have shown but a few modifications of the invention, it will be apparent to those skilled in the art that the invention may be embodied still otherwise without departing from the spirit and scope of the invention.

Having thus described the invention, what is desired to be secured by a Letters Patent is:

I claim:

1. In a machine for cutting kernels from ears of corn and having pairs of vertically spaced apart upper and lower powered rollers with the rollers of each pair carried respectively by upper and lower powered shafts, the rollers and shafts displaced during passage of an ear of corn along a course located between the rollers of each of said pairs, pairs of upper and lower equalizer arms swingably mounted on upper and lower pivots with each of said pairs responsive to the displacement of each pair of said shafts and the rollers thereon during the passage of each ear of corn therepast, linkage coupling said equalizer arms of each of said pairs of equalizer arms to ensure uniform shaft and roller displacement relative the course of the ears, a rotary cutter head disposed about the course of the ears and having a circular array of orbital knives simultaneously positionable toward and away from the course of the ears to sever kernels from each ear, means translating displacement of one of said shafts to position said orbital knives relative the course of the ears to sever the kernels, an improvement comprising:

motors each having an output shaft individually coupled to one each of said upper and lower shafts, a motor mount for each of said motors including a flexible member of synthetic material and having a distal portion and a proximal portion, support means on the machine on which said proximal portion is mounted, said distal portion of the motor mount supporting one of said motors and permitting motor displacement.

2. The improvement claimed in claim 1 wherein said flexible member is of planar configuration in a static condition.

3. The improvement claimed in claim 1 wherein said flexible member defines apertures, fastener elements received in said apertures and engageable with each of said motors.

4. The improvement claimed in claim 1 wherein said flexible member defines an open area to receive a motor.

5. The improvement claimed in claim 2 wherein said distal portion of said flexible member moves in a vertical plane normal to a plane containing said flexible member in a static condition.

6. The improvement claimed in claim 1 additionally including a clamp in place on said flexible member, fastener elements joining said clamp and said one hydraulic motor to said flexible member.

7. The improvement claimed in claim 1 wherein said linkage includes a link, pivot means coupling the link to a pair of said equalizer arms.

8. The improvement claimed in claim 7 wherein said pivot means includes pivot pins.

9. The improvement claimed in claim 8 wherein said upper and lower pivots for said equalizer arms lie in a vertical plane, said pivot pins oppositely offset from said plane.

10. A machine for cutting kernels from ears of corn during ear travel along a course, said machine including, pairs of powered rollers with the rollers of each of said pairs oppositely disposed from the course and moving the ears therealong, a cutter head assembly located along said course and including orbital knives for cutting the kernels from the ear, pairs of displaceable powered shafts each having one of said powered rollers thereon, motors each having an output shaft in individual driving engagement with one of said powered shafts, and flexible motor mounts each individually supporting one of said motors and being of planar shape, said output shaft of each of said motors located normal to the flexible motor mount supporting the motor, said flexible motor mounts permitting their respective motors thereon to be displaced during the passage of an ear of corn along said course and between one of said pairs of powered rollers.

11. The machine claimed in claim 10 additionally including a pair of equalizer arms swingable mounted on upper and lower pivots located in a vertical plane, a link located intermediate said pair of equalizer arms, and pivot pins each connecting one of said equalizer arms to said link.

12. The machine claimed in claim 11 wherein said motors are fluid driven.

13. The machine claimed in claim 12 wherein said motors are in series communication with a source of pressurized fluid.

14. The machine claimed in claim 10 additionally including means for jointly biasing each of said pairs of displaceable powered shafts and the powered rollers thereon toward the course of the ears.

15. A machine for cutting kernels from ears of corn during ear travel along a course, said machine including, pairs of powered rollers with the rollers of each of said pairs oppositely disposed from the course and moving the ears therealong, a cutter head assembly located along said course and including orbital knives for cutting the kernels from the ear, pairs of displaceable powered shafts each having one of said powered rollers thereon, motors each having an output shaft in individual driving engagement with one of said powered shafts, and means for individually supporting each of said motors and permitting lateral displacement of the motor output shaft and the powered shaft driven thereby during contact of the powered roller thereon with an ear.

* * * * *